US008296416B2

United States Patent
Fuchs et al.

(10) Patent No.: US 8,296,416 B2
(45) Date of Patent: Oct. 23, 2012

(54) REPRESENTING AGGREGATED RICH PRESENCE INFORMATION

(75) Inventors: Omri Fuchs, Ramat Gan (IL); Roni Korenshtein, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 220 days.

(21) Appl. No.: 12/181,703

(22) Filed: Jul. 29, 2008

(65) Prior Publication Data

US 2010/0030889 A1  Feb. 4, 2010

(51) Int. Cl.
*G06F 15/173* (2006.01)
(52) U.S. Cl. ........................ 709/224; 709/223
(58) Field of Classification Search .................... 709/224
See application file for complete search history.

(56) References Cited

U.S. PATENT DOCUMENTS

| | | | |
|---|---|---|---|
| 7,035,923 B1 * | 4/2006 | Yoakum et al. | 709/224 |
| 2002/0075303 A1 * | 6/2002 | Thompson et al. | 345/751 |
| 2003/0154293 A1 * | 8/2003 | Zmolek | 709/228 |
| 2005/0154796 A1 * | 7/2005 | Forsyth | 710/1 |
| 2007/0150825 A1 * | 6/2007 | Jachner | 715/765 |
| 2007/0239869 A1 | 10/2007 | Raghav et al. | |

OTHER PUBLICATIONS

J. Jachner et al., "Rich Presence: A New User Communications Experience," Alcatel, Technology White Paper, 2005, pp. 1-8.
"Avaya Communication Architecture," Avaya, White Paper, Mar. 2006, pp. 1-22.

* cited by examiner

*Primary Examiner* — William Goodchild
(74) *Attorney, Agent, or Firm* — Ryan, Mason & Lewis, LLP (57) ABSTRACT

Techniques for relaying presence information of an entity to a user, wherein the entity is known to the user via one or more communications networks, are provided. At least one portion of the presence information of the entity is obtained from one or more servers associated with the one or more communications networks. An image is generated in accordance with the at least one portion of the presence information of the entity. The image summarizes the presence information of the entity. Further, the image assists the user in the selection of a communication option when contacting the entity from a plurality of communication options of the entity.

20 Claims, 3 Drawing Sheets

- RECEIVE PRESENCE DOCUMENT — 402
- PARSE PRESENCE DOCUMENT — 404
- RETRIEVE PREFERENCES, QUALITY MEASURES, PRICES, ETC. — 406
- CREATE A PLATFORM NODE FOR EACH PLATFORM — 408
- CREATE A MEDIA NODE FOR EACH MEDIA TYPE — 410
- SORT NODES ACCORDING TO NODE PARAMETERS — 412
- TRAVERSE NODES AND GENERATE IMAGE — 414
- DISPLAY IMAGE — 416

FIG. 5

REPRESENTING AGGREGATED RICH PRESENCE INFORMATION

FIELD OF THE INVENTION

The present invention relates generally to presence information and, particularly, to techniques for aggregating and presenting presence information of an entity.

BACKGROUND OF THE INVENTION

Current technologies enable a person to communicate with others using multiple communication platforms and media types. Communication platforms may include different communication providers (e.g., SKYPE, YAHOO, MSN, SAMETIME, AOL, etc.) and media types may include different methods of communication, such as text, voice, and/or video based communications. Communications between parties may be one way or two way and they may vary according to the devices and applications used. During these communications, the availability of a user to communicate with others via a specific platform and media type is relayed using presence information. Generally, presence information represents the status of a presentity and may be used to show if the presentity is present or not present and/or available or not available to communicate.

Considering the many different forms of communication available to a presentity, there may be multiple presence statuses for a single presentity. Each status may reflect an availability of the presentity to communicate via a specific platform and media type. In many instances, the multiple statuses are scattered across multiple presence servers. Currently, standards and products exist which allow a presence server to aggregate this scattered presence information into a single document. Further, some integrated client software can retrieve presence information from multiple presence servers and facilitate communications via different communication systems.

When these products present presence information, they usually display separate lists for each available platform associated with a presentity or an integrated list listing the various available communication platforms of the presentity. A graphical presence icon is commonly used to indicate the level of availability of the presentity and the specific platform being used by the presentity. Other software clients only show a single presence icon even though more than one media type is available for the presentity. The main issue with these systems is that either the icon only shows one presence detail of the presentity (e.g., availability of the presentity on one specific platform and media type) and hides other presence details, or a long list of presence icons are displayed for the presentity, which occupies a large area of space.

SUMMARY OF THE INVENTION

Principles of the present invention provide techniques that overcome the above-mentioned drawbacks associated with existing methods by providing techniques that address the above needs, as well as other needs. Particularly, principles of the invention provide techniques for generating an image summarizing the presence information of an entity (i.e., presentity).

For example, in one embodiment of the invention, a technique for relaying presence information of an entity to a user, wherein the entity is known to the user via one or more communications networks, is provided. At least one portion of the presence information of the entity is obtained from one or more servers associated with the one or more communications networks. An image is generated in accordance with the at least one portion of the presence information of the entity. The image summarizes the presence information of the entity. Further, the image assists the user in the selection of a communication option when contacting the entity from a plurality of communication options of the entity.

In one embodiment, the image may comprise one or more sub-images, each of the one or more sub-images conveying information comprising at least one of an availability status of the entity, a time of availability of the entity, a communication platform of the entity, a communication method of the entity, a cost of communication, and a quality of communication. The image may be generated as follows. An ordered structure comprising one or more nodes may be constructed, wherein each of the one or more nodes represent at least one of a communication platform of the entity and a communication method of the entity. The one or more nodes of the ordered structure may be annotated with at least one of the at least one portion of the presence information of the entity and one or more communication parameters associated with the entity and the user. The one or more nodes of the ordered structure may be sorted in accordance with at least one of one or more communication parameters associated with the entity and the user, one or more communication preferences of at least one of the entity and the user, and one or more communication capabilities of the user. The image may be generated by traversing the one or more nodes.

In additional embodiments, the above technique for relaying presence information of an entity to a user, wherein the entity is known to the user via one or more communications networks, may be carried out by an apparatus and/or a computer program product.

These and other objects, features, and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be described in conjunction with exemplary methods for relaying presence information of a presentity to a user. Specifically, the present disclosure will illustrate techniques for generating an image summarizing the presence information of a presentity. It should be understood, however, that the invention is not limited to the particular embodiments described herein. The principles of this invention are generally applicable to any depiction of presence information of a presentity to one or more users (e.g., subscribers). Modifications to the illustrative embodiments will become apparent to those skilled in the art given the teachings described herein.

The term "presentity" as used herein is intended to be construed broadly so as to encompass, by way of example and without limitation, an entity identified by presence information.

The term "presence information" as used herein is intended to be construed broadly so as to encompass, by way of example and without limitation, any information related to the status of a presentity. In one example, presence information may be in the form of a status indicator that conveys the ability and willingness of a presentity to communicate with another.

The term "user" as used herein is intended to be construed broadly so as to encompass, by way of example and without limitation, any person or thing with the ability to view the presence information of a particular presentity. In one example, a user subscribes to a communications network to view the presence information of another.

The term "communication method" as used herein is intended to be construed broadly so as to encompass, by way of example and without limitation, any form or type of communication, which may include, but is not limited to, text-based communications (e.g., chat forums), audio-based communications (e.g., teleconferences), and/or visual-based (e.g., video) communications. A communication method may also be referred to as a media type.

The term "communication platform" as used herein is intended to be construed broadly so as to encompass, by way of example and without limitation, any communications network comprising unique communication protocols and communication methods. Examples of communication platforms may include SKYPE, YAHOO, MSN, SAMETIME, and AOL.

Unlike conventional techniques for presenting presence information of a presentity to users, an image that completely conveys all the presence information of a presentity over multiple communication platforms and media types is proposed. Unlike current presence images, the proposed image may also reflect communication costs, communication quality, present and future availability of the presentity, communication preferences of a user and/or the presentity, and communication capabilities of a user. This allows a user to immediately appreciate the complex presence status of the presentity and assists the user in the selection of an appropriate communication option (e.g., a specific communication platform and/or a specific communication method) when contacting the presentity.

Figure 1:
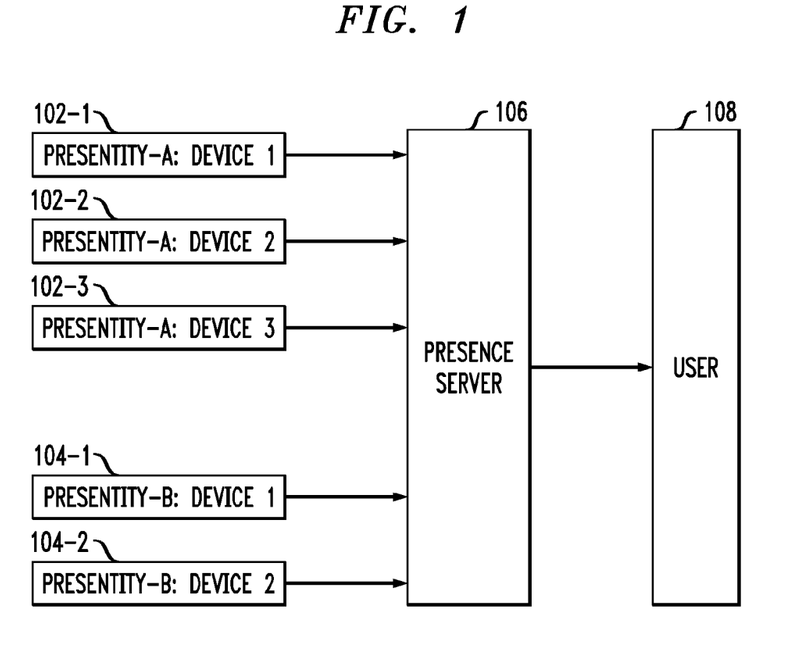
FIG. 1 is a diagram illustrating one embodiment of a user obtaining the presence information of multiple presentities using multiple devices, from a presence server, according to an embodiment of the present invention.

Referring initially to FIG. 1, a diagram illustrates one embodiment of a user 108 obtaining the presence information of multiple presentities using multiple devices (e.g., 102-1, 102-2, 102-3, 104-1, and 104-2), from a presence server 106, according to an embodiment of the present invention. In this illustrative embodiment, presentity-A is connected to one or more communications networks via three devices (102-1, 102-2, and 102-3) allowing for three different communication options. Further, presentity-B is connected to one or more communications networks via two devices (104-1 and 104-2) allowing for two different communication options. It is to be appreciated that the techniques described herein may be applied to any number of presentities and devices, and is not limited to the number of presentities and devices described herein.

Examples of devices may include a personal digital assistant (PDA), a desktop computer, and a cellular phone. These devices may have communications software pre-installed, for example, a chat program may be installed on a PDA allowing an entity to chat with others in chat forums maintained by a communications network (e.g., AOL instant messenger). Further, each device may support one or more communication methods (e.g., media types). For example, a PDA may support text communications (e.g., text messaging), audio communications (e.g., voice calls), and video communications (e.g., videophone).

In the embodiment of FIG. 1, presence server 106 acts as a presence information aggregator. The presence server 106 may be a stand-alone system networked to the one or more communications networks in which presentity-A and presentity-B communicate with other entities, or presence server 106 may be a component coupled to the one or more communications networks. In an exemplary embodiment, the presence server 106 combines the presence information related to each device of presentity-A into one comprehensive presence document. Also, the presence server 106 combines the presence information related to each device of presentity-B into another comprehensive presence document. These documents are published to one or more users 108 subscribed to the one or more communications networks in which presentity-A and presentity-B are associated. Each user 108 may receive one presence document per presentity.

Figure 2:
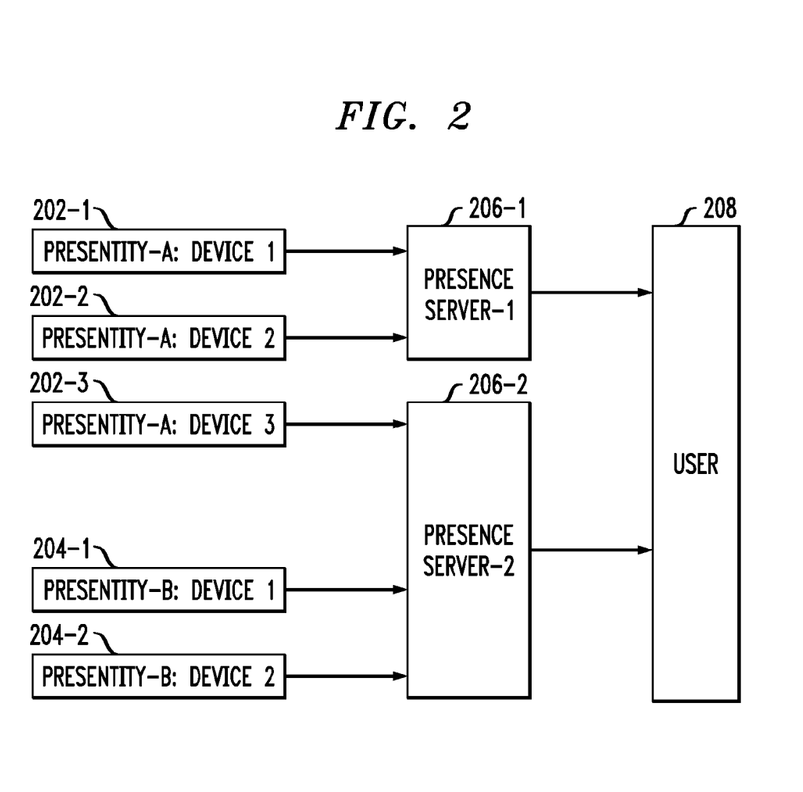
FIG. 2 is a diagram illustrating one embodiment of a user obtaining the presence information of multiple presentities using multiple devices, from multiple presence servers, according to an embodiment of the present invention.

Referring now to FIG. 2, a diagram illustrates one embodiment of a user 208 obtaining the presence information of multiple presentities using multiple devices, from multiple presence servers (206-1 and 206-2), according to an embodiment of the present invention. In an illustrative embodiment, multiple presence servers, presence server-1 206-1 and presence server-2 206-2, generate multiple presence documents for separately gathered presence information. Presence server-1 206-1 produces one presence document comprising the presence information of presentity-A for device 1 (202-1) and device 2 (202-2). Presence server-2 206-2 produces two presence documents. One document comprises the presence information of presentity-A for device 3 (202-3) and one document comprises the presence information of presentity-B for device 1 (204-1) and device 2 (204-2). Presence server-1 206-1 publishes its one presence document to user 208. Further, presence server-2 206-2 publishes its two presence documents to user 208. It should be noted that any number of presence servers may be utilized, not only two.

In this example, the user 208 receives two presence documents related to presentity-A and one document related to presentity-B. In an illustrative embodiment, the user 208 obtains presence documents from the presence servers (206-1 and 206-2) via a computer-based device. The computer-based device may be connected to the presence servers via the internet or other network connection. Further, the computer-based device may comprise a user application (see FIG. 3, block 304), which retrieves and reads the presence documents published by the presence servers (206-1 and 206-2). The user application may then generate an image summarizing the presence information of a given presentity. In the illustrative embodiment of FIG. 2, the user application combines the presence information contained in the two presence documents associated with presentity-A and generates one image for presentity-A. Also, the user application generates a second image for presentity-B using the one presence document associated with presentity-B. The contents of a presence document and the generation of an image summarizing the presence information of a presentity will be described below in greater detail, with reference to FIGS. 3 and 4.

Figure 3:
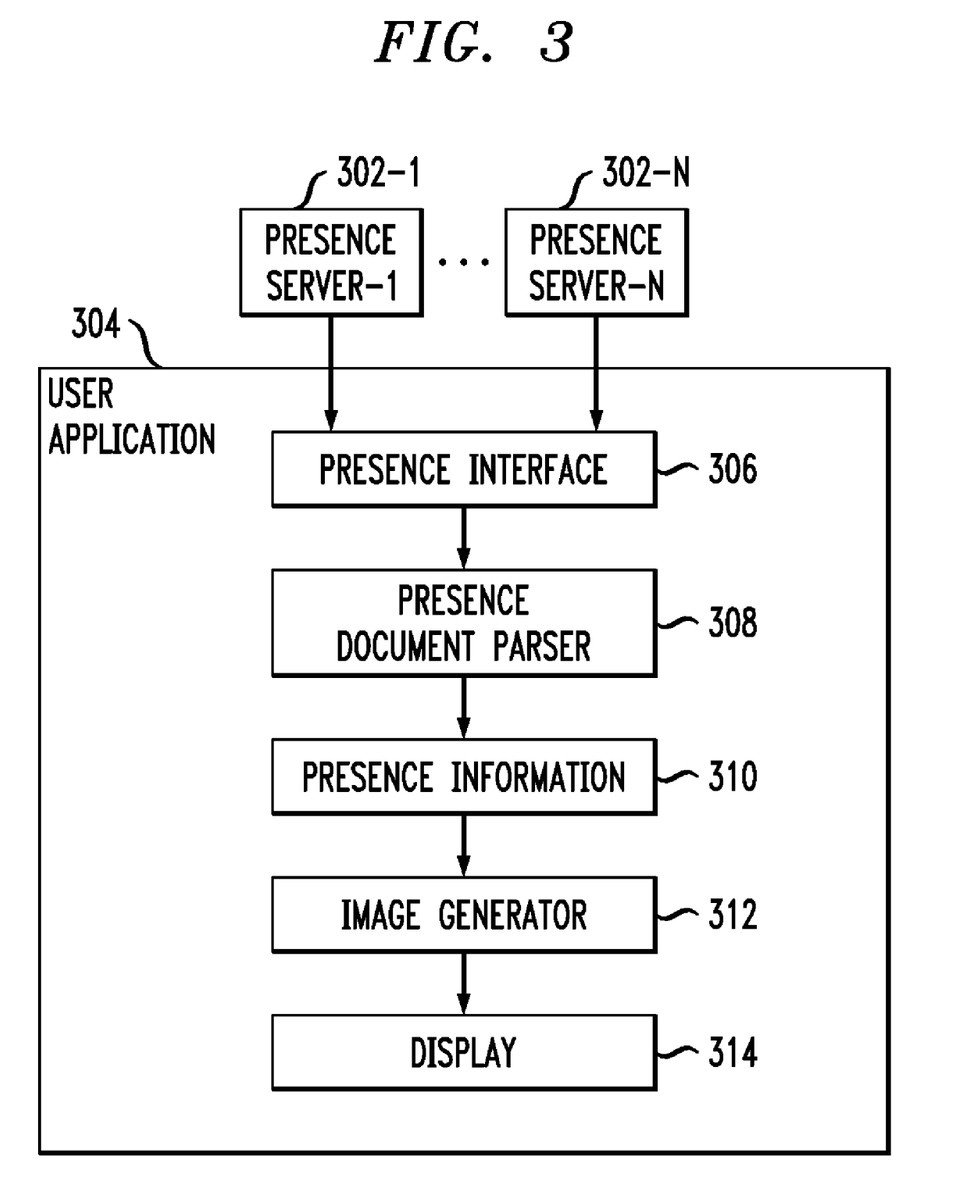
FIG. 3 is a flow diagram illustrating a methodology of a user application for processing presence documents from multiple presence servers, according to an embodiment of the present invention.

Referring now to FIG. 3, a flow diagram illustrates a methodology of a user application 304 for processing presence documents from multiple presence servers (e.g., 302-1, . . . 302-N), according to an embodiment of the present invention. As illustrated in FIG. 2, multiple presence documents associated with one presentity may be obtained from multiple presence servers (302-1, . . . 302-N).

In an exemplary embodiment, the user application 304 comprises a presence interface 306, which is in communication with the one or more presence servers (302-1, . . . 302-N). The presence interface 306 retrieves one or more presence documents associated with a presentity. A presence document may comprise presence information which may include: an availability status of a presentity (e.g., available, busy, away, do not disturb, offline, etc.), a time of availability of the presentity (e.g., presentity is available to chat daily from 9 AM to 5 PM, etc.), a communication platform of the presentity (e.g., SKYPE, YAHOO, MSN, SAMETIME, AOL, etc.), a communication method of the presentity (e.g., text, video, voice, etc.), and/or an availability of the presentity as a function of the availability status of the presentity, the time of availability of the presentity, the communication platform of the presentity, and/or the communication method of the presentity (e.g., the presentity is "available" for video communications on YAHOO between 3 PM and 5 PM).

A presence document parser 308 extracts the presence information 310 from the one or more presence documents associated with a given presentity. Presence document parsing is known to a person having ordinary skill in the art and may be carried out as any Extensible Markup Language (XML) is parsed, which may involve using, for example, Simple API for XML (SAX), Document Object Model (DOM), or any other standard format schema.

In addition to presence information 310, the user application 304 may also obtain additional information related to the communications between a user and a presentity, such as, one or more communication parameters associated with the presentity and the user, one or more communication preferences of the presentity, one or more communication preferences of the user, and/or one or more communication capabilities of the user.

Communication parameters may include information related to a relative or absolute cost of a communication (e.g., value per minute of communication), and a relative or absolute quality of a communication (e.g., excellent, good, poor, etc.). For example, a user contacting a presentity via telephone (i.e., voice communication) may have a connection that is both poor in quality and costs $0.99 per minute. In an exemplary embodiment, the user application 304 may obtain communication parameters directly from the one or more communications networks (i.e., communication service providers).

Communication preferences of the presentity and/or the user may comprise information related to: a preferred communication platform (e.g., a presentity or user may prefer YAHOO over other communication platforms), a preferred communication method (e.g., a presentity or user may prefer text messages over other methods of communication), a preferred availability status (e.g., a presentity or user may only want to display or see "available" communications), a preferred time of availability (e.g., a presentity or user may prefer communications during specific times of the day), a preferred cost of communication (e.g., a presentity or user may prefer cheaper communications over expensive communications), and/or a preferred quality of communication (e.g., a presentity or user may prefer "good" quality communications over "poor" quality communications).

The one or more communication preferences of the presentity may be retrieved using methods known to a person having ordinary skill in the art. Standard methods include searching for Q values in the presentity's communication registry, which may be provided by the one or more communications networks in which the presentity is associated, or searching for priority tags within a retrieved presence document in Presence Information Data Format (PIDF) or other preferences system. A presentity's communication preferences may also be found in PIDF extensions and by utilizing the proprietary systems maintained by the one or more communications networks in which the presentity is associated. The one or more communication preferences of the user may be obtained directly from the user via the user application 304. The user, using an interface of the user application 304, may set specific values or rule-based values which apply to specific presentities or groups of presentities. For example, the user may prefer one communication option with one presentity and may prefer another communication option with other presentities.

Communication capabilities of a user may comprise information related to an ability of the user to communicate. For example, a user may only have the ability to communicate via text, not video or voice. The user application 304 may determine the one or more communication capabilities of a user by assessing the one or more communication devices of the user. For instance, the user application 304 may detect that the user has a microphone and speakers which allows for voice communications. Further, the user application 304 may determine that the user cannot videoconference because there is no video camera attached to the user's communication device.

The presence information 310, communication parameters, communication preferences, and communication capabilities are processed by the image generator 312. The image generator 312 generates an image for a given presentity. The image is then presented to the user via a display 314. The generated image enables the user to understand, in a single view, the complex presence status of the presentity.

In one embodiment, the image generator 312 generates a single image representing the best communication option to be used by a user to contact a given presentity (e.g., a highest ranked communication). The single image may convey an availability status of the presentity, a time of availability of the presentity, a communication platform of the presentity, a communication method of the presentity, a cost of communication, and/or a quality of communication. The determination of the best communication option may be based on a rule set. The rule set evaluates the presence information of a given presentity, in its entirety, in accordance with obtained communication parameters, communication preferences, and/or communication capabilities. For example, a presentity A may be capable of the following communications: (1) text messages on platform X; (2) voice calls on platform Y; and (3) voice calls on platform Z. An illustrative rule set may first consider that presentity A prefers text messages on platform X, but presentity A's status for that communication is set as "away." Since presentity A is "away," the rule set may then consider other communication options in which presentity A is "available." In this example, presentity A may be "available" for voice calls on platform Y and voice calls on platform Z. The rule set may then determine which option is less expensive between voice calls on platform Y and voice calls on platform Z. Assuming that voice calls on platform Y are less expensive, it is selected as the best communication option. At this point, the image generator 312 may generate, for example, one green image in the shape of a telephone with the label "Y," to show that presentity A is available to communicate via voice calls on platform Y.

The rule set may be more complex. Using the example above, if the quality of voice calls on platform Y is poor, the rule set may select voice calls on platform Z even though it is more expensive. In the alternative, if the user does not have the capability to communicate with presentity A via voice and/or the user does not have access to platforms Y or Z, the rule set may denote text messages on platform X as the best communication option. In this case, the image may be a red icon in the shape of a tablet with text, showing that presentity A may communicate via text on platform X, but is currently "away." It is to be appreciated that additional weights and rules may be added to the rule set to obtain the best communication option.

In an alternative embodiment, the image generated by the image generator 312 may be an integrated image. Unlike the single image described above, an integrated image allows a user to see all existing communication options with a presentity, not only the best communication option. The integrated image may be a combination of smaller images (e.g., sub-images). Together, the sub-images convey the entire presence status of a presentity.

The integrated image may reflect any and all presence information, which may include: (1) availability level of the presentity (e.g., available, busy, away, do not disturb, offline, etc.); (2) type and name of communication platform (e.g., SKYPE, YAHOO, MSN, SAMETIME, AOL, etc.); (3) type of media (e.g., voice, video, text, etc.); and/or (4) time of availability (e.g., how long the presentity will be available to communicate using a specific communication option). The integrated image may also reflect any and all: communication parameters associated with the presentity and the user (e.g., cost of communication, quality of communication, etc.), communication preferences of the presentity and/or the user (e.g., preferred communication platform, communication method, availability status, time of availability, cost of communication, quality of communication, etc.), and/or communication capabilities of the user (e.g., available communication devices of the user).

A user may use the integrated image to make complex communication decisions. For instance, the sub-images may direct the user to wait a certain amount of time to utilize a 'soon to be available' communication option that is of better quality and less costly. In the alternative, the user may want to contact a presentity immediately because the user's preferred communication (e.g., less costly and better quality) may not be available in the near future.

In an exemplary embodiment, the image generator 312 may organize the sub-images within the integrated image by applying different values, or weights, to the presence information. The weight system may be in accordance with obtained communication parameters, communication preferences, and/or communication capabilities. For example, the following factors, in no particular order, may be used to weigh sub-images: (1) quality of communication, or quality of service of each platform for a particular media type; (2) cost of communication; (3) preferences of the user; (4) preferences of the presentity; (5) device capabilities of the user; (6) availability status of the presentity; (7) time of availability of the presentity; (8) communication platform of the presentity; and/or (9) media type of the presentity.

The organization of sub-images may indicate that one communication option is preferred over another communication option. For example, communications in which a presentity is "available" may be grouped together towards the upper portion of a generated image while communications in which the presentity is "away" may be grouped together towards the bottom portion of the generated image. Further, higher quality and less expensive communications may be ordered before (e.g., to the left of the integrated image) lower quality and more expensive communications. In the alternative, communications in which a presentity is "available" may be placed towards the upper portion of the integrated image, communications in which the presentity is "away" may be placed in the middle, and communications in which the presentity wishes to be undisturbed may be placed at the bottom. The sub-images may then be ordered from left to right according to media type, with text on one side, voice in the middle, and video at the end.

The integrated image may also be generated in accordance with a rule set like the single image described above. Since an integrated image with many sub-images may be difficult to understand intuitively, the rule set may be used to eliminate sub-images. In an exemplary embodiment, the rule set may eliminate sub-images according to user preferences and communication capabilities. For instance, the user may define which platforms, media types, and presence statuses should be displayed. In one example, a user may prefer that an "offline" communication not be displayed if there are other viable communication options. As a result, if a presentity is "offline" for text communications, "busy" for video communications, and "available" for voice communications, the integrated image may only comprise two sub-images, one green voice icon and one orange or red video icon. Further, the integrated image may not show the option for video if the user's communication device cannot support video communications. Additionally, if there are two voice-based communication options, the less costly option may only be displayed.

Graphical properties of an integrated image may also be used to express the complex presence status of a presentity. As previously illustrated, the location of a sub-image within the integrated image may express partiality of one communication option over another option. Additionally, various color and texture schemes may also be used to express presence information. Background color, foreground color, border color and/or filling color of a sub-image may express multiple presence statuses. For example, the color green may represent that a presentity is available, the color red may represent that a presentity is offline, the color orange may represent that a presentity is idle, and a grayed-out sub-image may represent that a presentity is unavailable or that a specific communication option is unavailable to the user. Further, a gold border may represent that a communication is high in cost. Brightness of the colors of the sub-image may also be used to express presence status. For example, a bright red may represent that the presentity may be unavailable for a long period of time and a dimming red may represent that the presentity may be available in the near future (e.g., a time of availability of the presentity is approaching). It is to be appreciated that any color and texture scheme may be applied to express the presence status of a presentity.

Shape and style may also be used to indicate a presence status. For instance, the shape of a sub-image may indicate the platform and media type of a connection. In one embodiment, an image of a cellular phone with a specific platform logo may be used to represent voice calls on that particular platform. In additional embodiments, the image may be a PDA, a computer terminal, and a tablet with lines to represent text communications. Further, animation effects such as blinking or changing brightness may be applied. For instance, a blinking image may represent that a new communication option just became available. Also, the size of a sub-image with relation to other sub-images may be used to relay presence. For example, a large sub-image may represent a good connection quality while a little sub-image may represent a poor connection quality. In addition to these graphical properties, the integrated image may also comprise embedded text or numbers. It is to be appreciated that any graphic or graphical effect may be used to generate an image.

Figure 4:
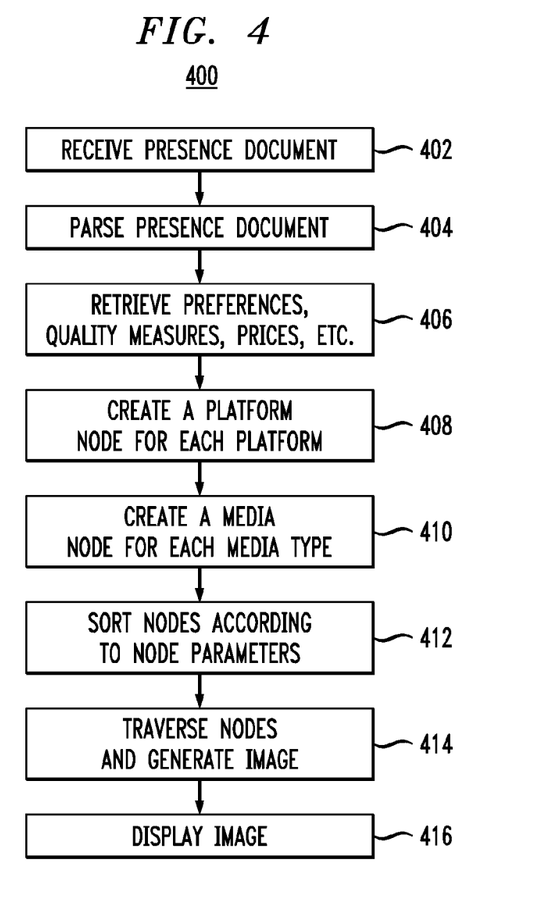
FIG. 4 is a flow diagram illustrating a methodology for assembling an image that relays the presence information of a presentity to a user, according to an embodiment of the present invention.

Referring now to FIG. 4, a flow diagram illustrates a methodology for assembling an image that relays the presence information of a presentity to a user, according to an embodiment of the present invention. Methodology 400 begins at step 402 where one or more presence documents are received by a user application. As discussed above with reference to FIG. 3, the presence documents may be supplied by one or more presence servers. At step 404, the one or more presence documents are parsed and presence information is retrieved (step 406). Concurrently, at step 406, one or more communication parameters, one or more communication preferences, and one or more communication capabilities may be obtained as described above with reference to FIG. 3.

In an exemplary embodiment, the image generator 312 of FIG. 3 utilizes an image assembly algorithm to generate an image. At step 408, the algorithm determines how many communication platforms are available to a presentity and constructs a data structure comprising nodes representing each communication platform of the presentity (e.g., platform nodes). At step 410, the algorithm determines the existing media types of the presentity for each available communication platform and creates nodes representing each media type (e.g., media nodes). Each of the media nodes are attached to its corresponding platform node, thus maintaining the relationships between the nodes. For example, if a presentity can communicate on platform X using text and voice, one text media node and one voice media node will be generated stemming from platform node X.

In an illustrative embodiment, the platform and media nodes may be filtered (e.g., deleted) from the data structure, in accordance with the preferences and communication capabilities of the user. For example, the user may indicate that he/she would not like to see: (1) platform or media types in which the presentity is "away" or "offline"; (2) a particular communication platform; (3) certain media types or specific media types on specific platforms; (4) media types where the communication quality is below a specified level; (5) media types in which a presentity is not available in the near future; and/or (6) media types that are beyond the user's device capabilities (e.g., the user has no camera for video communications). It is to be appreciated that the processing of platform and media nodes is not limited to the embodiments described herein and any filter may be applied.

After the data structure is constructed, the nodes of the data structure are annotated with text and graphical properties (e.g., fonts, colors, textures, etc.), which may be in accordance with obtained presence information, communication parameters, communication preferences, and/or communication capabilities. For example, the text and/or graphics of a platform node may reflect the following information: (1) which platform it represents; (2) the overall level of availability of the presentity; and/or (3) information regarding expected changes to the overall level of availability (e.g., when and amount of change in the presentity's level of availability). Further, the text and/or graphics of a media node may reflect the following information: (1) which media it represents; (2) the level of availability of the presentity via the media type; (3) information regarding expected changes to the overall level of availability (e.g., when and amount of change in the presentity's level of availability); (4) the communication quality of the media type; (5) information regarding expected changes to the communication quality (e.g., when and amount of change in communication quality); (6) the cost of communicating over the media type; and/or (7) information regarding expected changes to the cost of communication (e.g., when and amount of change in the cost of communication).

At step 412, the algorithm then sorts the platform nodes and media nodes. In one embodiment, the parameters of the nodes (e.g., the annotated text and graphical properties) are compared to one or more communication preferences of the user. For example, the user may request media types with the lowest cost, highest communication quality, and best level of availability. The algorithm may first organize the platform nodes by cost, quality, and availability. Then, for each platform node, the algorithm may organize each connected media node according to cost, quality, and availability.

At step 414, the image may be generated by traversing the data structure of nodes and decorating the image based on the text and graphical annotations of the nodes. The image may be generated via the following steps. First, the image may be divided into graphical portions, each graphical portion representing one platform node (i.e., platform portions). Each platform portion may then be decorated based on the annotations of its corresponding platform node. Each platform portion may be decorated to reflect the following information: (1) which platform the platform portion represents; (2) the overall level of availability of the presentity; and/or (3) information regarding expected changes to the overall level of availability (e.g., when and amount of change in the presentity's level of availability).

Each graphical platform portion may then be divided into smaller graphical portions, each smaller graphical portion representing one media node (i.e., media portions). Each media portion may then be decorated based on the annotations of its corresponding media node. The decorations may reflect the following information: (1) which media type the media portion represents; (2) the level of availability of the presentity via the media type; (3) information regarding expected changes to the overall level of availability (e.g., when and amount of change in the presentity's level of availability); (4) the communication quality of the media type; (5) information regarding expected changes to the communication quality (e.g., when and amount of change in communication quality); (6) the cost of communicating over the media type; and/or (7) information regarding expected changes to the cost of communication (e.g., when and amount of change in the cost of communication).

It should be noted that the graphical portions of the image (e.g., platform portions and media portions) may be decorated relative to other platform and media portions to effectively relay differences in presence status between the platforms and media types of the presentity. After all the nodes are traversed and the final image is generated, the image is displayed to the user (step 416).

Figure 5:
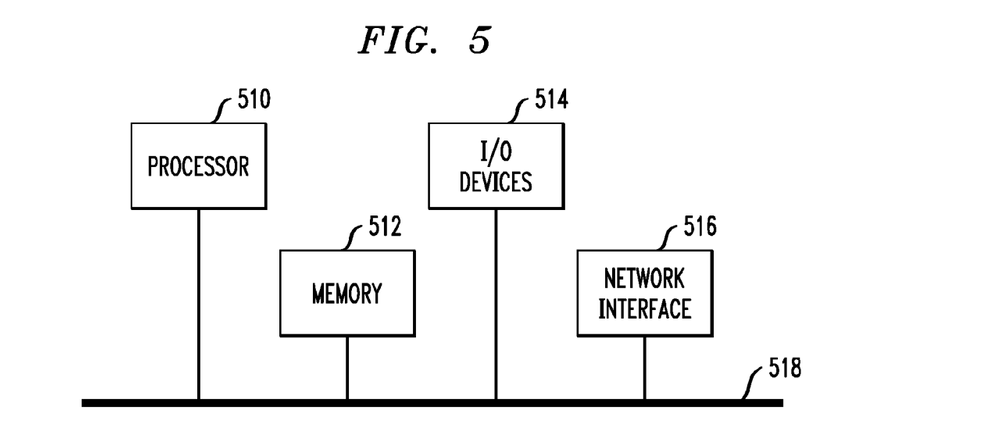
FIG. 5 is a diagram illustrating an illustrative hardware implementation of a computing system in accordance with which one or more components/methodologies of the present invention may be implemented, according to an embodiment of the present invention.

Referring now to FIG. 5, block diagram 500 illustrates an exemplary hardware implementation of a computing system in accordance with which one or more components/methodologies of the invention (e.g., components/methodologies described in the context of FIGS. 1-4) may be implemented, according to an embodiment of the present invention.

As shown, the techniques for relaying presence information of an entity to a user, wherein the entity is known to the user via one or more communications networks, may be implemented in accordance with a processor 510, a memory 512, I/O devices 514, and a network interface 516, coupled via a computer bus 518 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Still further, the phrase "network interface" as used herein is intended to include, for example, one or more transceivers to permit the computer system to communicate with another computer system via an appropriate communications protocol.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, or a magnetic storage device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Further, the present invention was described above with reference to diagrams of methods, apparatus (systems), and computer program products according to embodiments of the invention. It will be understood that individual functions/acts in the diagrams, and combinations of functions/acts in the diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the diagrams.

These computer program instructions may also be stored in a computer-readable medium that may direct a computer or other programmable data processing apparatus to function in a particular manner, such that the instructions stored in the computer-readable medium produce an article of manufacture including instruction means which implement the functions/acts specified in the diagrams.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the diagrams.

The diagrams illustrate the architecture, functionality, and operation of possible implementations of systems, methods, and computer program products according to various embodiments of the present invention. In this regard, individual functions/acts in the diagrams may represent a module, segment, or portion of code, which comprises one or more executable instructions for implementing the specified logical function(s). It should also be noted that, in some alternative implementations, the functions/acts in the diagrams may occur out of the order noted in the diagrams. For example, two steps shown in succession may, in fact, be executed substantially concurrently, or the steps may sometimes be executed in the reverse order, depending upon the functionality involved. It will also be noted that individual functions/acts in the diagrams, and combinations of functions/acts in the diagrams, may be implemented by special purpose hardware-based systems that perform the specified functions or acts, or combinations of special purpose hardware and computer instructions.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for relaying presence information of an entity to a user, wherein the entity is known to the user via one or more communications networks, the method comprising the steps of:

obtaining at least one portion of the presence information of the entity from one or more servers associated with the one or more communications networks; and assembling an image in accordance with the at least one portion of the presence information of the entity, wherein at least a portion of the image represents a highest ranked communication option of a plurality of communication options for contacting the entity based on a rule set that evaluates the presence information of the entity, in its entirety, in accordance with at least one item of communication-related information, the image conveying presence information of the entity for at least the highest ranked communication option, and in accordance with at least one of one or more communication parameters associated with the entity and the user, one or more communication preferences of at least one of the entity and the user, and one or more communication capabilities of the user, wherein the one or more communication parameters comprise at least one of a cost of communication and a quality of communication.

2. The method of claim 1, wherein the one or more communication preferences comprise at least one of a preferred communication platform, a preferred communication method, a preferred availability status, a preferred time of availability, a preferred cost of communication, and a preferred quality of communication.

3. The method of claim 2, further comprising the step of obtaining the one or more communication preferences of the entity from at least one of Q values in a communication registry and priority tags of the at least one portion of the presence information.

4. The method of claim 2, further comprising the step of obtaining the one or more communication preferences of the user via a user application, wherein the user sets one or more values related to a communication with the entity.

5. The method of claim 1, wherein the image comprises a plurality of sub-images, each of the plurality of sub-images representing a respective one of the plurality of communication options, each of the plurality of sub-images conveying presence information of the entity for the respective one of the plurality of communication options.

6. The method of claim 5, wherein a given sub-image of the plurality of sub-images conveys information by at least one of a location of the given sub-image in the image, a background color of the given sub-image, a foreground color of the given sub-image, a border color of the given sub-image, a filling color of the given sub-image, a graphic of the given sub-image, a shape of the given sub-image, a text of the given sub-image, a size of the given sub-image relative to the one or more sub-images, a brightness of the given sub-image, an animation of the given sub-image, and a font of the given sub-image.

7. The method of claim 1, wherein the at least one portion of the presence information comprises at least one of an availability status of the entity, a time of availability of the entity, a communication platform of the entity, a communication method of the entity, and an availability of the entity as a function of at least one of the availability status of the entity, the time of availability of the entity, the communication platform of the entity, and the communication method of the entity.

8. The method of claim 1, further comprising the step of obtaining the one or more communication parameters associated with the entity and the user from the one or more communications networks.

9. The method of claim 1, further comprising the step of obtaining the one or more communication capabilities of the user from a user application, wherein the user application assesses one or more communications devices of the user.

10. The method of claim 1, wherein the step of assembling the image further comprises the steps of:

constructing an ordered structure comprising one or more nodes, wherein each of the one or more nodes represent at least one of a communication platform of the entity and a communication method of the entity;

annotating the one or more nodes of the ordered structure with at least one of the at least one portion of the presence information of the entity and the one or more communication parameters associated with the entity and the user;

sorting the one or more nodes of the ordered structure in accordance with at least one of the one or more communication parameters associated with the entity and the user, the one or more communication preferences of at least one of the entity and the user, and the one or more communication capabilities of the user; and assembling the image by traversing the one or more nodes.

11. An article of manufacture for relaying presence information of an entity to a user, wherein the entity is known to the user via one or more communications networks, the article comprising a non-transitory computer readable storage medium including one or more programs, which when executed by a computer implement the steps of claim 1.

12. The method of claim 1, wherein the image assists the user in the selection of a communication option when contacting the entity from the plurality of communication options of the entity.

13. An apparatus for relaying presence information of an entity to a user, wherein the entity is known to the user via one or more communications networks, the apparatus comprising:

a memory; and at least one processor coupled to the memory and operative to: obtain at least one portion of the presence information of the entity from one or more servers associated with the one or more communications networks; and assemble an image in accordance with the at least one portion of the presence information of the entity, wherein at least a portion of the image represents a highest ranked communication option of a plurality of communication options for contacting the entity based on a rule set that evaluates the presence information of the entity, in its entirety, in accordance with at least one item of communication-related information, the image conveying presence information of the entity for at least the highest ranked communication option, and in accordance with at least one of one or more communication parameters associated with the entity and the user, one or more communication preferences of at least one of the entity and the user, and one or more communication capabilities of the user, wherein the one or more communication parameters comprise at least one of a cost of communication and a quality of communication.

14. The apparatus of claim 13, wherein the image comprises a plurality of sub-images, each of the plurality of sub-images representing a respective one of the plurality of communication options, each of the plurality of sub-images conveying presence information of the entity for the respective one of the plurality of communication options.

15. The apparatus of claim 14, wherein in the operation of assembling the image, the at least one processor is further operative to: construct an ordered structure comprising one or more nodes, wherein each of the one or more nodes represent at least one of a communication platform of the entity and a communication method of the entity; annotate the one or more nodes of the ordered structure with at least one of the at least one portion of the presence information of the entity and the one or more communication parameters associated with the entity and the user; sort the one or more nodes of the ordered structure in accordance with at least one of the one or more communication parameters associated with the entity and the user, the one or more communication preferences of at least one of the entity and the user, and the one or more communication capabilities of the user; and assemble the image by traversing the one or more nodes.

16. The apparatus of claim 13, wherein the at least one portion of the presence information comprises at least one of an availability status of the entity, a time of availability of the entity, a communication platform of the entity, a communication method of the entity, and an availability of the entity as a function of at least one of the availability status of the entity, the time of availability of the entity, the communication platform of the entity, and the communication method of the entity.

17. The apparatus of claim 13, wherein the image assists the user in the selection of a communication option when contacting the entity from the plurality of communication options of the entity.

18. A computer program product for relaying presence information of an entity to a user, wherein the entity is known to the user via one or more communications networks, the computer program product comprising:
 a non-transitory computer readable medium;
 a first program instruction to obtain at least one portion of the presence information of the entity from one or more servers associated with the one or more communications networks; and
 a second program instruction to generate an image in accordance with the at least one portion of the presence information of the entity, wherein at least a portion of the image represents a highest ranked communication option of a plurality of communication options for contacting the entity based on a rule set that evaluates the presence information of the entity, in its entirety, in accordance with at least one item of communication-related information, the image conveying presence information of the entity for at least the highest ranked communication option, and in accordance with at least one of one or more communication parameters associated with the entity and the user, one or more communication preferences of at least one of the entity and the user, and one or more communication capabilities of the user, wherein the one or more communication parameters comprise at least one of a cost of communication and a quality of communication; and
 wherein the first and second program instructions are stored on the non-transitory computer readable medium.

19. The computer program product of claim 18, wherein the at least one portion of the presence information comprises at least one of an availability status of the entity, a time of availability of the entity, a communication platform of the entity, a communication method of the entity, and an availability of the entity as a function of at least one of the availability status of the entity, the time of availability of the entity, the communication platform of the entity, and the communication method of the entity.

20. The computer program product of claim 18, wherein the one or more communication preferences comprise at least one of a preferred communication platform, a preferred communication method, a preferred availability status, a preferred time of availability, a preferred cost of communication, and a preferred quality of communication.

* * * * *